US011911340B2

(12) United States Patent
Jakobsson

(10) Patent No.: US 11,911,340 B2
(45) Date of Patent: Feb. 27, 2024

(54) FLUID CONTAINER

(71) Applicant: MÖLNLYCKE HEALTH CARE AB, Gothenburg (SE)

(72) Inventor: Conny Jakobsson, Lerum (SE)

(73) Assignee: MÖLNLYCKE HEALTH CARE AB, Gothenburg (SE)

(*) Notice: Subject to any disclaimer, the term of this patent is extended or adjusted under 35 U.S.C. 154(b) by 564 days.

(21) Appl. No.: 17/255,883

(22) PCT Filed: Jun. 28, 2019

(86) PCT No.: PCT/SE2019/050636
§ 371 (c)(1),
(2) Date: Dec. 23, 2020

(87) PCT Pub. No.: WO2020/009644
PCT Pub. Date: Jan. 9, 2020

(65) Prior Publication Data

US 2021/0244615 A1 Aug. 12, 2021

(30) Foreign Application Priority Data

Jul. 5, 2018 (SE) .................................... 1850852-3

(51) Int. Cl.
*A61J 1/14* (2023.01)
*B65D 17/28* (2006.01)
(Continued)

(52) U.S. Cl.
CPC ............... *A61J 1/1412* (2013.01); *A61J 1/12* (2013.01); *B65D 17/4011* (2018.01); *B65D 23/06* (2013.01); *B65D 47/066* (2013.01)

(58) Field of Classification Search
CPC ...... A61J 1/2003; A61J 1/2024; A61J 1/2093; A61J 1/14; A61J 1/1412; A61J 1/00;
(Continued)

(56) References Cited

U.S. PATENT DOCUMENTS 3,309,000 A * 3/1967 Haverstick ............ B65D 25/48 220/4.03
3,356,266 A * 12/1967 Pinter, Jr. ............... B65D 25/48 220/733

(Continued)

FOREIGN PATENT DOCUMENTS

BE 1009645 A6 6/1997
CN 2286459 Y 7/1998

(Continued)

OTHER PUBLICATIONS

CN 201980038933.0, "Third Office Action" dated Sep. 21, 2022 (17 pages, including English-language translation).

(Continued)

*Primary Examiner* — Susan S Su
*Assistant Examiner* — Ted Yang
(74) *Attorney, Agent, or Firm* — Kilpatrick Townsend & Stockton LLP

(57) ABSTRACT

A fluid container for holding a fluid, specifically adapted for improved user handling by reducing the risk of fluid spillage in combination with easy extraction of the fluid comprised in the container. The present disclosure also relates to a fluid container system.

17 Claims, 4 Drawing Sheets

(51) Int. Cl.
*A61J 1/12* (2006.01)
*B65D 23/06* (2006.01)
*B65D 47/06* (2006.01)

(58) Field of Classification Search
CPC ........... A61J 1/12; A61J 1/05; B65D 17/4011; B65D 23/06; B65D 47/066
See application file for complete search history.

(56) References Cited

U.S. PATENT DOCUMENTS

| | | | | | |
|---|---|---|---|---|---|
| 3,598,278 | A * | 8/1971 | Vann, Jr. | A47G 19/02 | D7/396.1 |
| 3,781,164 | A * | 12/1973 | McCaffery | F21V 35/00 | 431/291 |
| 3,811,136 | A * | 5/1974 | Whitney | A61B 10/007 | 4/144.1 |
| 3,878,571 | A * | 4/1975 | Seeley | A61G 9/006 | 600/580 |
| 4,064,760 | A * | 12/1977 | Benjamin | A61B 10/007 | 73/863.52 |
| 4,316,560 | A * | 2/1982 | Carter | B44D 3/128 | 220/733 |
| 4,369,890 | A * | 1/1983 | Bennett | B44D 3/128 | 220/4.03 |
| 4,408,644 | A * | 10/1983 | Svantesson | A47G 19/2205 | D7/533 |
| 4,940,158 | A * | 7/1990 | Farrell | B65D 81/3453 | 220/276 |
| 4,994,056 | A * | 2/1991 | Ikeda | A61J 1/2093 | 604/87 |
| 5,593,891 | A * | 1/1997 | Banes | C12M 23/38 | 220/731 |
| 5,860,556 | A | 1/1999 | Robbins, III | | |
| 5,975,373 | A * | 11/1999 | Forsberg | B65D 47/10 | 141/351 |
| 6,032,824 | A * | 3/2000 | Barrow | A01K 5/0135 | 220/625 |
| 6,386,138 | B1 * | 5/2002 | Schramm | A63H 33/28 | 220/736 |
| 6,544,213 | B1 * | 4/2003 | Lifshey | A61J 1/067 | 604/89 |
| 7,014,074 | B1 * | 3/2006 | Rinaldi | B65D 41/065 | 222/461 |
| 8,459,450 | B1 * | 6/2013 | Whitaker | A61J 9/00 | 215/11.4 |
| 9,598,209 | B1 * | 3/2017 | Maldonado | B65D 47/103 | |
| 2002/0180114 | A1 * | 12/2002 | Cargile | B65D 35/08 | 206/277 |
| 2002/0190114 | A1 * | 12/2002 | Lowry | B65D 3/04 | 229/4.5 |
| 2003/0044971 | A1 * | 3/2003 | Lyman | C12M 23/10 | 435/305.4 |
| 2004/0011695 | A1 * | 1/2004 | Wright | A61B 90/40 | 220/628 |
| 2004/0194716 | A1 * | 10/2004 | Morrison | A01K 7/005 | 119/61.1 |
| 2007/0045323 | A1 * | 3/2007 | Kroiss | A61J 19/00 | 220/495.06 |
| 2007/0084819 | A1 * | 4/2007 | Fialkowski | A61J 9/00 | 215/11.1 |
| 2012/0116327 | A1 * | 5/2012 | Calladine | A61J 1/1443 | 604/289 |
| 2012/0168450 | A1 * | 7/2012 | Samson | B65D 47/2031 | 220/703 |
| 2013/0175294 | A1 * | 7/2013 | Holden | B65D 25/465 | 222/110 |
| 2014/0238543 | A1 * | 8/2014 | Terayama | B65D 3/14 | 141/332 |
| 2015/0173536 | A1 * | 6/2015 | Frangione | A47G 19/02 | 220/574 |
| 2016/0176592 | A1 * | 6/2016 | Lorimier | B65D 51/185 | 220/23.89 |
| 2018/0009590 | A1 * | 1/2018 | Wong | B65D 1/0246 | |

FOREIGN PATENT DOCUMENTS

| | | | |
|---|---|---|---|
| CN | 2803965 | Y | 8/2006 |
| CN | 204250520 | U | 4/2015 |
| CN | 105658534 | A | 6/2016 |
| EP | 2060502 | A1 | 5/2009 |
| GB | 2474040 | A | 4/2011 |
| JP | 11227388 | | 8/1999 |
| KR | 20100090235 | A | 8/2010 |

OTHER PUBLICATIONS

CN Application No. 201980038933.0, “Second Office Action” dated Jun. 14, 2022, 11 pages (including English translation).

International Application No. PCT/SE2019/050636, International Search Report dated Aug. 27, 2019, 4 pages.

European Patent Application No. 19 83 0470, extended European Search Report dated Feb. 23, 2022, 7 pages.

* cited by examiner

FLUID CONTAINER

CROSS-REFERENCE TO RELATED APPLICATIONS

This application is a filing under 35 U.S.C. § 371 based on PCT/SE2019/050636, filed Jun. 28, 2019, which claims priority to Swedish Application No. 1850852-3, filed Jul. 5, 2018, each of which is incorporated by reference herein in their entirety.

TECHNICAL FIELD

The present disclosure generally relates to a fluid container for holding a fluid, specifically adapted for improved user handling by reducing the risk of fluid spillage in combination with easy extraction of the fluid comprised in the container. The present disclosure also relates to a fluid container system.

BACKGROUND

Resistant organisms, such as MRSA and VRE, are an increasing problem in modern health care facilities. Once a patient becomes colonized and acquires an infection from a resistant organism, it is difficult and costly to treat the infection.

Accordingly, nowadays it is common practice to perform pre-surgical or skin puncture preparation by delivery of an antiseptic composition to the body area being prepared for an invasive procedure. Chlorhexidine gluconate (CHG) is one example of a highly effective broad-spectrum topical antiseptic composition. It is effective against both so called gram-positive and gram-negative bacteria. In addition, CHG exhibits the property of persistence in that it continues its anti-microbial activity beyond immediate bacteria elimination, providing protection several hours beyond an initial application. Moreover, CHG exhibits a cumulative property that improves efficacy after multiple applications. Finally, CHG is well-tolerated on human skin. It is currently considered to be the premiere topical antiseptic ingredient by the health care community. Another example of a possible antiseptic is Povidone-iodine (PVP-I).

Generally, the antiseptic composition, such as the CHG or the PVP-I, is applied to the patient's skin immediately before the surgical procedure, for example by a nurse. This process may in some situations comprise preparing the antiseptic composition in an open mixing vessel of any suitable size depending upon the target quantity desired, such as a kidney bowl, for example by providing a suitable quantity of the PVP-I or by mixing the CHG and a dye together. One or a plurality of swabs or sponges are then typically soaked in the mixing vessel (or container/receptacle), and subsequently applied to the relevant body area using a handheld device, for example a pair of forceps or a hemostat, to direct the saturated swabs or sponge to the relevant body area.

Handling of the antiseptic composition in the open mixing vessel may in some situations result in severe spillage of the antiseptic composition, which is clearly unsuitable in for example an operating theater. For trying to overcome this problem, there have been proposed integrated antiseptic delivery systems, where e.g. the vessel and applicator (e.g. swab or sponge) is combined. An example of such a solution is presented in US20140322072.

In US20140322072, it is proposed to provide a container body component holding the antiseptic composition, and a head component comprising e.g. a swab or a sponge. During use, the head component is connected to the container body component in order to break a portion of the container body component and allow the antiseptic to flow from the container body component through the head component and into the integrated swab or sponge.

Even though the solution proposed in US20140322072 shows some improvements to the open type mixing vessels as discussed above, it may in some situations be desirable to ensure proper recycling of any residual portions of the antiseptic composition, i.e. rather than simply disposing the total integrated antiseptic delivery system.

With the above in mind, there appears to be room for further improvements for reducing the risk of fluid spillage of the antiseptic in combination with easy extraction of any residual antiseptic contained in the mixing vessel, container or receptacle.

SUMMARY

According to an aspect of the present disclosure, it is therefore provided a fluid container, comprising a lower container body adapted for receiving a fluid and comprising a container wall, a base provided at a lower edge of the container wall, the base formed in an essentially rigid material, and an upper container body connected to and extending along a circumference of an upper edge of the container wall, the upper container body comprising a flap portion provided to extend along a circumference of the upper container body, the flap portion forming an opening to the lower container body, wherein the container wall is arranged to be angled inwardly towards a center of the lower container body, and the flap portion is flexible and adapted to be adjustably arranged in a down-folded state angled below the upper edge of the container wall or in an up-folded state angled above the upper edge of the container wall.

The present disclosure is based upon the realization that when the flap portion is arranged in the down-folded state it is possible to allow for a predefined amount of liquid to be stored in the container, without the risk of any leakage. That is, once the flap portion is arranged in the down-folded state the flap portion will essentially form a downwardly arranged "funnel" with a centrally arranged opening. Even though an opening is provided, the fluid will not spill out, even in case the container is arranged on its side or upside down (of course dependent on the amount of fluid arranged within the fluid container, as will be further discussed below), thus in an embodiment seen as a fluid trap. Accordingly, the risk of spillage within e.g. an operating theater is greatly reduced.

However, once the flap portion is arranged in its up-folded state, the flap portion will essentially function as an upwardly arranged "funnel" with a centrally arranged opening. Accordingly, in this state e.g. a user may be allowed to easily extract the fluid from within the container, i.e. without having to use any external e.g. suction means or by removing any form of screw cap or similar.

The expression "flap portion" should in line with the present disclosure be interpreted broadly. That is, the flap portion may essentially be formed of any type of flexible material, preferably arranged to be allowed to be flexible once transitioning from the down-folded to the up-folded state (and vice versa), but at the same time self-supporting once in the selected state. Accordingly, once in the down-folded or the up-folded state, the flap portion is preferably arranged in line with the above-mentioned funnel form.

The base allows for the fluid container to be firmly stabilized once e.g. arranged on an essentially flat surface, such as on a table, etc. The container wall are furthermore advantageously slightly angled towards a center of the lower container body, meaning that the base essentially is arranged to have a larger diameter as compared to a diameter of the upper container body, giving the fluid container a slightly tapered form. This further enhances the stability of the fluid container. An outer surface of the container wall may also be provided with gripping means, such as e.g. ridges, for allowing easy handling of the fluid container with reduced risk of dropping the fluid container.

In an embodiment, the fluid container is manufactured from a plastic material or a combination of a plastic material and carton (e.g. the lower container body from carton and the upper container body from plastic). E.g. plastic pressed edges formed during manufacturing of the fluid container may be arranged to function as a "hinge" for allowing the flap portion to be transitioned between the up-folded and the down-folded state. The plastic may for example include polyethylene or similar or including a polyethylene film.

The base may for example be essentially circular. In case the base is circular, then the flap portion will also be essentially circular. However, other forms are possible and within the scope of the present disclosure.

An inner surface of the base may in a possible embodiment of the present disclosure be arranged to be essentially concave. This may advantageously allow for the fluid to be concentrated towards the center of the inner surface of the base, thereby allowing the fluid to be easily acquired by the user, e.g. using a swab or sponge as discussed above.

It may in accordance to an embodiment of the present disclosure be possible to arrange the upper edge of the container wall to comprise a collar portion. The collar portion may in one embodiment be angled towards a center of the lower container body, thereby further reducing the spillage of the fluid, e.g. when a user lifts a saturated swab or sponge from inside of the fluid container.

In an embodiment, the flap portion comprises an outer edge and an inner edge, the inner edge forming the opening to the lower container body. A diameter of the opening of the flexible flap portion may in one embodiment be arranged to be between 50 mm and 70 mm. In such an embodiment, the user may be provided easy access to the fluid, while the opening at the same time is kept small enough for reducing any unwanted spillage.

Furthermore, the fluid container may also comprise a first lid detachably connected to the inner edge of the flap portion and extending over the opening to the lower container body when the flap portion is arranged in the up-folded state. The lid is typically provided during transport and prior to use of the fluid container, for example in case the fluid container is transported with the flap portion arranged in the up-folded state. The first lid is then to be removed before use of the fluid container.

Alternatively, the fluid container may be arranged to comprise a second lid detachably connected to the inner edge of the flap portion and extending over the opening to the lower container body when the flap portion is arranged in the down-folded state. This may typically be the case when the fluid container is transported with the flap portion arranged in the down-folded state. Again, the second lid is then to be removed before use of the fluid container.

Additionally, it may be possible to further include a third lid detachably connected to the outer edge of the flap portion and extending over the opening to the lower container body when the flap portion is arranged in the down-folded state. Accordingly, when the fluid container is transported with the flap portion arranged in the down-folded state, e.g. a space formed between the second and the third lid may be used for receiving at least one of a swab and a dye to be mixed with a fluid arranged within the fluid reservoir. This embodiment may allow for the transport of a combination of the fluid container with e.g. the swab or sponge to be used for applying the fluid to the patient in a manner as discussed above.

Preferably, at least one of the first, the second and the third lid comprises a seal off foil or a film. Such a lid is thus easily "peeled off" when the fluid container is to be used.

In an alternative embodiment, the fluid container is selected to be "non-self-supporting". For example, instead of using a "rigid" structure in regards to the lower container, the lower container body may instead be a plastic bag. Such a plastic bag may for example be attached to the upper container body using plastic welding and adapted to hold the fluid. However, in such an embodiment the lower container body is this not self-supporting and may be needed to be held by user during use.

The fluid container may preferably form part of a fluid container system, further comprising a fluid. The fluid may for example be an antiseptic composition, in some embodiments comprising a chlorhexidine gluconate (CHG) and/or an alcohol.

Preferably, the fluid container is sterilized and may further comprise a packaging adapted to ensure that the fluid container is kept in a sterile environment.

Further features of, and advantages with, the present disclosure will become apparent when studying the appended claims and the following description. The skilled addressee realizes that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1A:
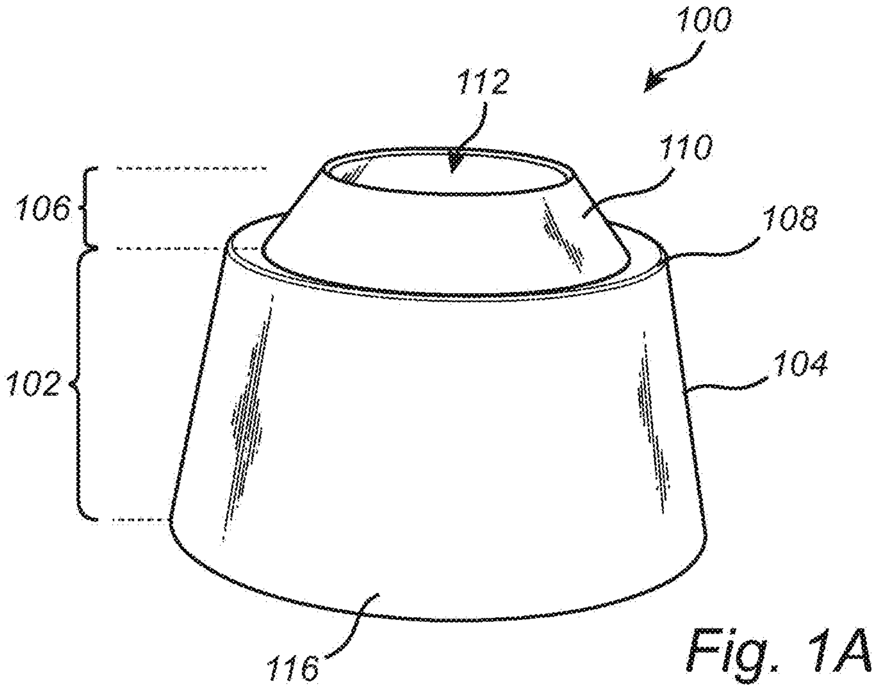
FIGS. 1A-1C presents a detailed illustration of an exemplary fluid container according to an embodiment of the present disclosure.

The present disclosure will now be described more fully hereinafter with reference to the accompanying drawings, in which currently preferred embodiments of the present disclosure are shown. The present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Figure 1B:
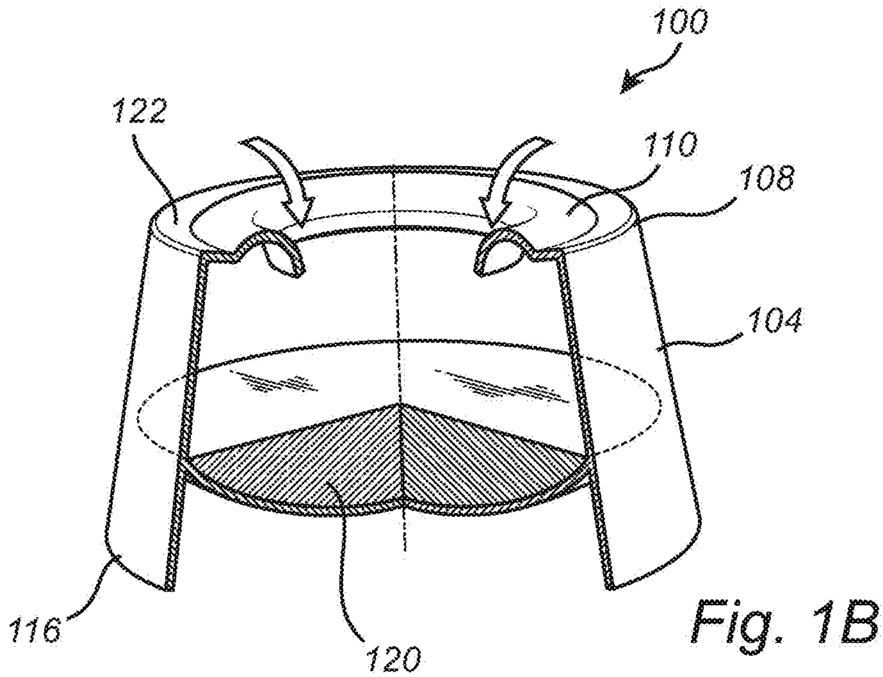
Figure 1C:
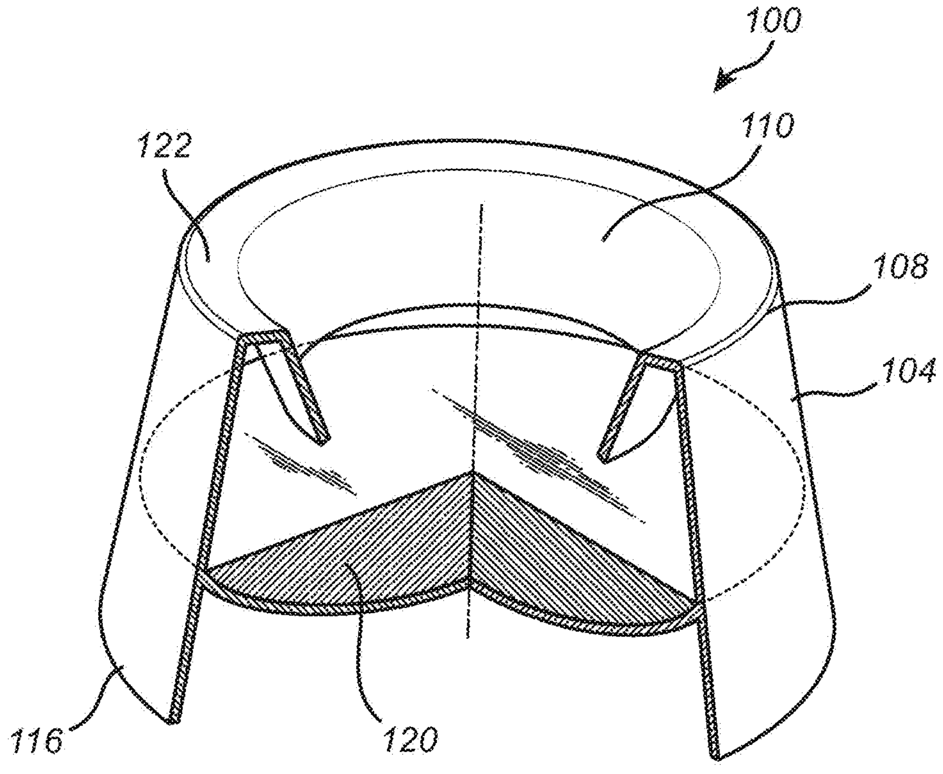

Turning now to the drawings and to FIGS. 1A-FIG. 1C in particular, there is provided a detailed illustration of a fluid container 100 in line with the present disclosure, presented with a flap portion 100 arranged in an up-folded state (FIG. 1A) and a down-folded state (FIG. 1C). The fluid container 100 comprises a lower container body 102 arranged to receive a fluid 120, such as an antiseptic composition as discussed above. The lower container body 102 comprises a container wall 104, during normal use typically arranged in an essentially vertical direction (with possible alternatives as will be elaborated further below).

The fluid container 100 also comprises an upper container body 106 connected to and extending along a circumference of an upper edge 108 of the container wall 104. The upper container body 106 in turn comprises the above-mentioned flap portion 110. The flap portion 110 is in turn arranged to extend along a circumference of the upper container body 106, the flap portion 110 forming an opening 112 to the lower container body 102.

The flap portion 110 is in accordance with the present disclosure selected to be flexible, thereby allowing the flap portion 110 to be arranged in either of said down-folded state, where the flap portion 110 is angled below the upper edge 108 of the container wall 104 or in said up-folded state angled above the upper edge 108 of the container wall 104. Accordingly, the flap portion 110 is typically only "stable" in either one of the up-folded or the down-folded state. For example, a user may "push" down the flap portion 110 when in the up-folded state (transitioning between the states as illustrated in FIG. 1B), such that the flap portion 110 stays in the down-folded state. Similarly, the user may "pull-up" the flap portion 110 once in the down-folded state, such that the flap portion 110 stays in the up-folded state. Thus, in general operation of the fluid container 100 the flap portion 110 will only transition between the up-folded state and the down-folded state, without "staying stable" between these two states.

As is apparent from FIG. 1A, the user may easily pour out any e.g. residual fluid 120 from the fluid container 100 once the flap portion 110 is arranged in the up-folded state, such as for example for allowing easy recycling of any residual portions of the antiseptic composition after applying the same to e.g. a body part of a patient.

Conversely, as may be seen from FIG. 1C, once the flap portion 110 is in the down folded state the fluid containers 100 effectively function as a fluid trap, meaning that the fluid 120 will stay within the fluid container 100 even if the fluid container 100 would be positioned on the side or upside down. The "fluid trap functionality" is of course dependent on the amount of fluid 120 arranged within the lower container body. Accordingly, in some embodiments it may be desirable to provide a marker e.g. on the inside or outside of the lower container body 102, where the marker indicates a maximum filling level to ensure the fluid trap functionality. Said maximum filling level is of course dependent on the selected height and width of the fluid container 100, in combination with a selected diameter of the opening 112 of the fluid container 100. The fluid trap functionality further allows for any spillage of the fluid 120 to flow back into the interior of the fluid container 100.

In the illustrated embodiment as shown in FIGS. 1A-1C, the lower container body 102 is illustrated to be essentially circular, in combination with an essentially circular opening 112 provided by means of the flap portion 110. However, it should be understood that the lower container body 102 may be differently shaped, e.g. including having an essentially rectangular or polygonal shape. The fluid container 100 preferably also comprises a base 116 arranged at a lower edge of the container wall 118 of the container wall 104. The base is preferably arranged in an essentially rigid material, ensuring that the fluid container 100 stays stable at a surface, such as a table within an operating theatre.

In an embodiment of the present disclosure the fluid container 100 is further provided with a collar portion 122, provided as a component of the upper edge 108 of the container wall. Possibly, the collar portion 122 may be arranged to be slightly downwardly inclined towards the center of the fluid container 100, thereby ensuring that any spillage of the fluid 120 is directed towards the interior of the fluid container 100.

In an embodiment of the present disclosure the diameter of the opening 112 of the flexible flap portion 110 is selected to be between 50 mm and 70 mm (in case of an essentially circular opening 112, with a corresponding area in case of a different form of the opening 112). Correspondingly, an overall width (or possibly diameter in case of an essentially circular lower container body 102) of the fluid container 100) may for example be at least 50 mm to 150 mm. A possible height of the fluid container 100 may for example be between 40 mm to 150 mm. Other heights, widths and opening sizes (as well as shapes) are of course possible and within the scope of the present disclosure.

Figure 2A:
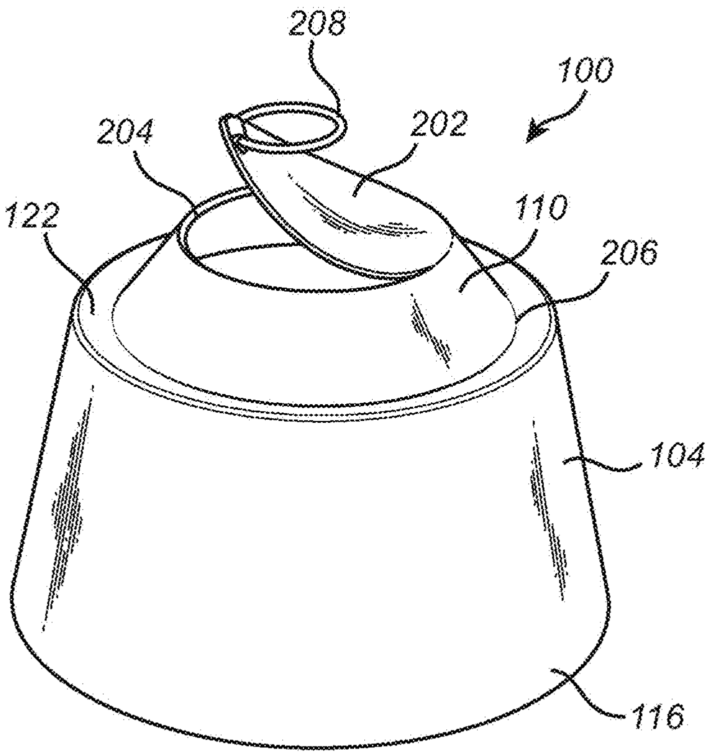
FIGS. 2A and 2B provides further exemplary embodiment of the fluid container.
Figure 2B:
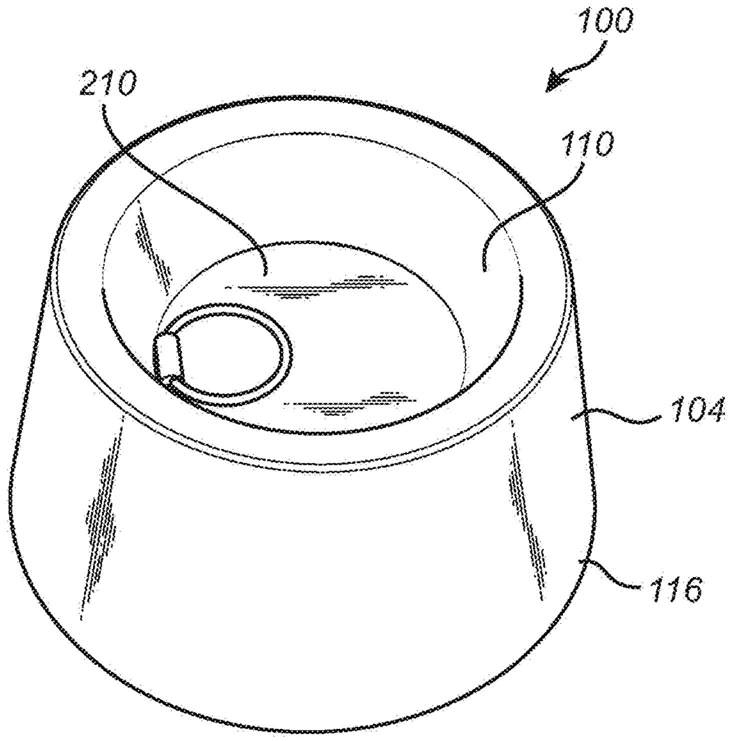

With further reference to FIGS. 2A and 2B, there is illustrated a further possible embodiment of the present disclosure. Specifically, in FIG. 2A the fluid container 100 further comprises a first lid 202 detachably connected to an inner edge 204 of the flap portion 110 and extending over the opening 112 to the lower container body 102 when the flap portion 110 is arranged in the up-folded state. The inner edge 204 forms the opening 112. The flap portion 110 further comprises an outer edge 206.

The first lid 202 may for example be provided with a ring 208 or similar for facilitating a removal of the first lid 202. By means of including the first lid 202 with the fluid container 100, it may for example be possible to allow for the fluid 120 to be distributed within the fluid container 100, i.e. whereby a user may detach the first lid 202 only once the fluid container 100/fluid 120 is to be used.

In an alternative embodiment, with further reference to FIG. 2B, the fluid container 100 may instead be provided with a second lid 210. The second lid 210 may instead be provided in case the flap portion 110 is arranged in the down-folded state. That is, the second lid 210 will provide a similar functionality as the first lid 202, however adapted for an embodiment where the fluid container 100 is distributed with the flap portion 110 in the down folded state. The second lid 210 may be provided with similar means for facilitating detachment of the second lid 210.

In the embodiment as shown in FIG. 2B it may additionally (or alternatively) be possible to provide the fluid container 100 with a third lid (not shown). The third lid is in such an embodiment detachably connected to the outer edge 206 of the flap portion 110 and extending over the opening 112 to the lower container body 102 when the flap portion 110 is arranged in the down-folded state.

In case both of the second 210 and the third lids are provided, then a space is formed between the second 210 and the third 212 lid. This space may for example be used for storage of a swabs or sponge (not shown). As an alternative, the spaced formed between the second 210 and the third lid may be adapted for storage of a component of the antiseptic composition (or similar).

In relation to FIGS. 1A-1C and FIGS. 2A-2B, the fluid container 100 is preferably formed (manufactured, e.g. by blow or injection molding) from a plastic material. However, other material is possible and within the scope of the present disclosure. For example, a combination of paper, metal and plastic may be used for ensuring that the container wall 102 (and thus the fluid container 100) is self-supporting. Other future materials are of course possible and within the scope of the present disclosure. It should also be understood that a mixture of materials is possible, for example selected based on the composition of the fluid 120. That is, it is preferred to select a material of the fluid container 100 to ensure that a shelf storage time of the fluid 120, such as in case of an antiseptic composition, is kept as long as possible, i.e. with minimal impact based on the selected material.

In addition, the first 202, the second 210 and the third lid comprises a seal off foil or a film. The foil or film may for example be provided as a plastic foil or film, possibly selected based on the fluid 120 in a similar manner as discussed above.

Figure 3A:
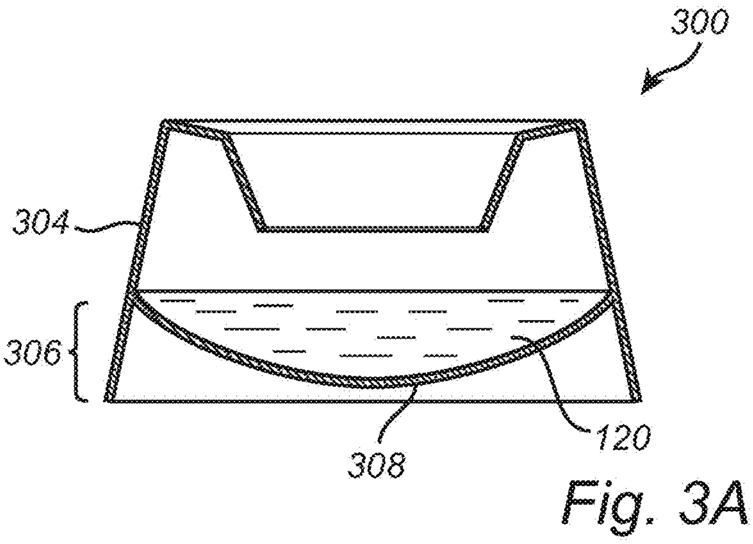
FIGS. 3A-3C show conceptual implementations of the fluid container provided in line with the present disclosure.
Figure 3B:
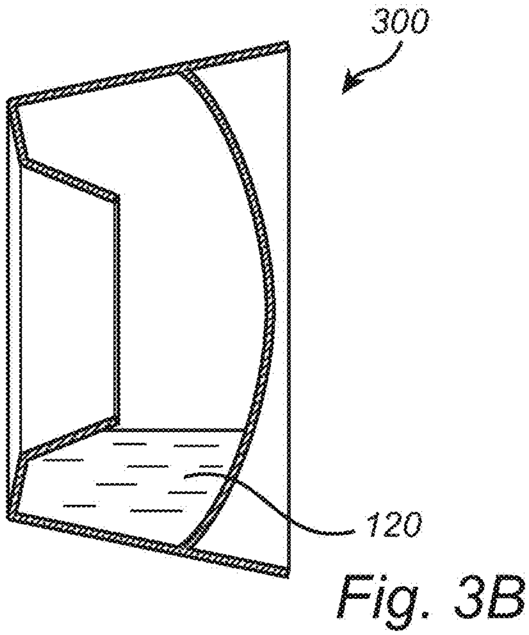
Figure 3C:
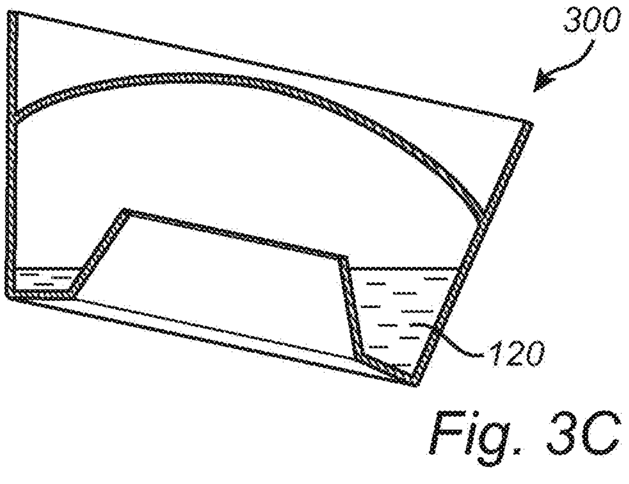

Turning now to FIGS. 3A-3C, conceptually presenting a further embodiment of the present disclosure, illustrated during different states of positioning of an alternative fluid container 300 in a cross-section manner. The fluid container 300 essentially corresponds to the fluid container 100 as illustrated in FIGS. 1A-1C and FIGS. 2A-2B. However, in FIGS. 3A-3C the container wall 304 is arranged to be slightly angled towards a center of the lower container body 102. That is, the container wall 304 may be arranged to give the fluid container 300 a slightly tapered form, where the upper portion of the fluid container 300 is slightly narrower as compared to the opposing bottom end of the fluid container 300. As such, the fluid container 300 will be ensuring to stay stable at a flat surface (such as the mentioned table of the operating theater, or similar).

In an embodiment of the present disclosure the fluid container 300 is provided with a base 306 having a concave inner surface 308. The concave inner surface 308 ensures that the fluid 120 is collected at the center of the bottom of the fluid container 300, thereby facilitating an easy extraction of the fluid 120. That is, once only a small portion of the fluid 120 is left inside of the fluid container 300, this portion of the fluid 120 will be easily reached by the mentioned swabs or sponge. The fluid container 100 may be provided with a corresponding concave inner surface of the base 116.

FIGS. 3B and 3C provides further illustrations of the fluid container 300. As is seen, in FIG. 3B the fluid container 300 has been rotated to anti-clockwise (to the left) slightly above 90 degrees. Due to the fluid trap functionality as implemented by means of the present disclosure once the flap portion 110 is arranged in the down-folded state (and as long as the amount of fluid 120 is below a predefined volume), the fluid container 300 may be rotated as in FIG. 3B or even further as shown in FIG. 3C where the fluid container 300 is almost completely turned over as compared to in case of normal operation where the fluid container 300 is positioned at a flat surface, without any spillage of the fluid 120.

Accordingly, even in case the fluid container 300 is to be tipped or be rolling over, the fluid 120 will stay within the fluid container 300, as long as the flap portion 110 is arranged at its down folded state.

In summary, the present disclosure relates to a fluid container 100, comprising a lower container body 102 adapted for receiving a fluid 120 and comprising a container wall 104, and an upper container body 106 connected to and extending along a circumference of an upper edge 108 of the container wall 104, the upper container body 106 comprising a flap portion 110 provided to extend along a circumference of the upper container body 106, the flap portion 110 forming an opening 112 to the lower container body 102, wherein the flap portion 110 is flexible and adapted to be adjustably arranged in a down-folded state angled below the upper edge 108 of the container wall 104 or in an up-folded state angled above the upper edge 108 of the container wall 104.

The present disclosure is based upon the realization that when the flap portion is arranged in the down-folded state it is possible to allow for a predefined amount of liquid to be stored in the container, without the risk of any leakage. That is, once the flap portion is arranged in the down-folded state the flap portion will essentially form a downwardly arranged "funnel" with a centrally arranged opening. Even though an opening is provided, the fluid will not spill out, even in case the container is arranged on its side or upside down, thus in an embodiment seen as a fluid trap. Accordingly, the risk of spillage within e.g. an operating theater is greatly reduced.

Furthermore, any of the fluid container 100, 300 are preferably delivered as a sterile disposable product, preferably with the fluid 120 included, forming a fluid container system, possibly also comprising a disposable swab or sponge (but not necessarily). To ensure that the fluid container 100, 300 is kept sterile up until use, it is preferred to arrange the fluid container 100, 300 is a sterile packaging (not shown). Such a sterile fluid container system may be provided as a component of a kit to be used when performing an e.g. operation.

Although the figures may show a sequence the order of the steps may differ from what is depicted. Also, two or more steps may be performed concurrently or with partial concurrence. Such variation will depend on the systems chosen and on designer choice. All such variations are within the scope of the disclosure. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the present disclosure, from a study of the drawings, the disclosure, and the appended claims. Furthermore, in the claims, the word "comprising" does not exclude other elements or steps, and the indefinite article "a" or "an" does not exclude a plurality.

Furthermore, in the foregoing description, various embodiments have been presented for the purpose of illustration and description. They are not intended to be exhaustive or to limit the disclosure to the precise forms disclosed. Obvious modifications or variations are possible in light of the above teachings. The embodiments were chosen and described to provide the best illustration of the principals of the present disclosure and its practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

The invention claimed is:

1. A fluid container, comprising:

a lower container body adapted for receiving a fluid and comprising a container wall, a base provided at a lower edge of the container wall, the base formed in an essentially rigid material, and an upper container body connected to and extending along a circumference of an upper edge of the container wall, the upper container body comprising a flap portion provided to extend along a circumference of the upper container body, the flap portion forming an opening to the lower container body, wherein:

the container wall is arranged to be angled inwardly towards a center of the lower container body, the flap portion is flexible and adapted to be adjustably arranged in a down-folded state angled below the upper edge of the container wall or in an up-folded state angled above the upper edge of the container wall, the flap portion comprises an outer edge and an inner edge, the inner edge forming the opening to the lower container body, and the fluid container farther comprises one of:

a first lid detachably connected to the inner edge of the flap portion and extending over the opening to the lower container body when the flap portion is arranged in the up-folded state, or a second lid detachably connected to the inner edge of the flap portion and extending over the opening to the lower container body when the flap portion is arranged in the down-folded state.

2. The fluid container according to claim 1, wherein the fluid container forms a fluid trap when the flap portion is arranged in the down-folded state.

3. The fluid container according to claim 1, wherein the base is circular.

4. The fluid container according to claim 1, wherein an inner surface of the base is concave.

5. The fluid container according to claim 1, wherein the container wall is self-supporting.

6. The fluid container according to claim 1, therein the upper edge of the container wall comprises a collar portion.

7. The fluid container according to claim 6, wherein the collar portion is angled towards a center of the lower container body.

8. The fluid container according to claim 1, wherein a diameter of the opening of the flap portion is between 50 mm and 70 mm.

9. The fluid container according to claim 1, wherein an outer surface of the container wall is provided with gripping means.

10. The fluid container according to claim 1, wherein the lower container body is a plastic bag.

11. The fluid container according to claim 1, further comprising a third lid detachably connected to the outer edge of the flap portion and extending over the opening to the lower container body when the flap portion is arranged in the down-folded state.

12. The fluid container according to claim 11, wherein a space formed between the second and the third lid is adapted to receive at least one of a swab and a dye to be mixed with the fluid arranged within the lower container body.

13. The fluid container according to claim 11, wherein at least one of the first, the second and the third lid comprises a seal off foil or a film.

14. A fluid container system, comprising:

a fluid container according to claim 1; and the fluid.

15. The fluid container system according to claim 14, wherein the fluid comprises an alcohol.

16. The fluid container system according to claim 14, wherein the fluid container is sterilized.

17. The fluid container system according to claim 14, further comprising a packaging adapted to ensure that the fluid container is kept in a sterile environment.

* * * * *